Dec. 10, 1968  A. WINKLER ET AL  3,415,599

MAGAZINE FOR MOTION-PICTURE FILM

Filed Jan. 19, 1966

INVENTOR.
ALFRED WINKLER
KARL BAMMESBERGER
BY
Michael J. Striker

United States Patent Office 3,415,599
Patented Dec. 10, 1968

3,415,599
MAGAZINE FOR MOTION-PICTURE FILM
Alfred Winkler, Munich, and Karl Bammesberger, Munich-Untermenzing, Germany, assignors to Agfa-Gevaert AG, Munich, Germany
Filed Jan. 19, 1966, Ser. No. 521,738
Claims priority, application Germany, Jan. 29, 1965, A 48,271
12 Claims. (Cl. 352—78)

ABSTRACT OF THE DISCLOSURE

A magazine for motion-picture film wherein a rotary partition driven by the film transporting mechanism divides the interior of the housing into first and second compartments which respectively accommodate the exposed and unexposed parts of the film. The partition and the housing comprise coaxial cores which extend into the first and second compartments to respectively support the exposed and unexposed parts of the film. The core of the partition has a socket which receives a conical bearing member of the housing.

Figure 1:
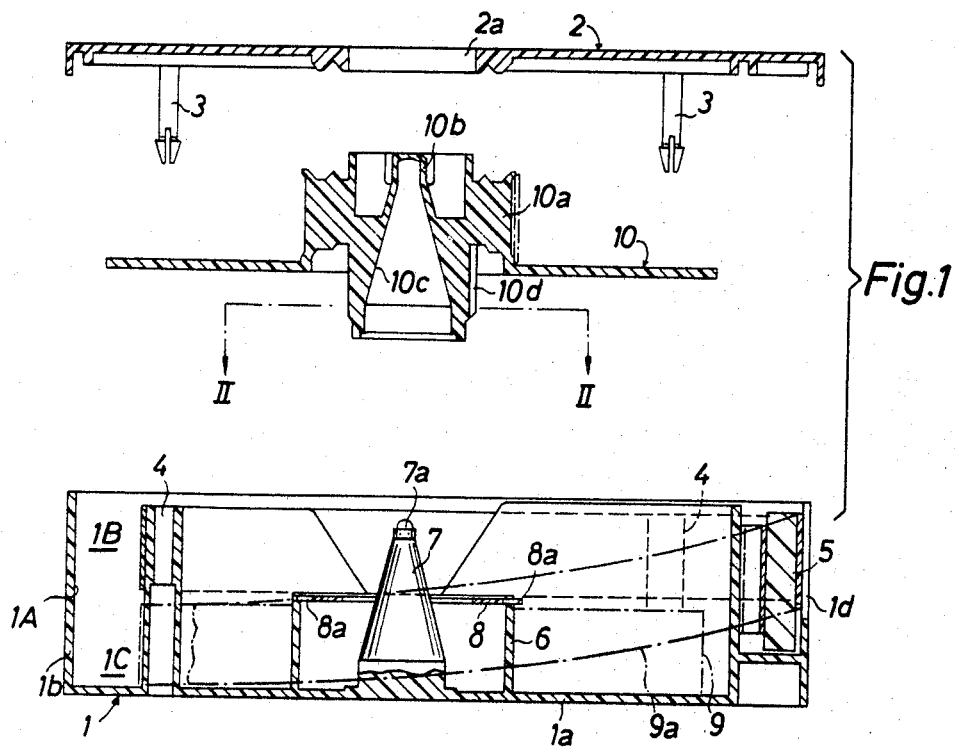

The present invention relates to magazines for motion-picture film, and more particularly to improvements in magazines for convoluted motion-picture film of the type wherein the exposed part of the film is stored coaxially with the unexposed part.

It is an important object of the present invention to provide a very simple, compact, inexpensive and reusable magazine for motion-picture film.

Another object of the invention is to provide a magazine of the just outlined characteristics wherein the film may be transported by exertion of a relatively small force, which can be readily taken apart to allow for convenient insertion or removal of film, and which can be mass-produced by resorting to known machinery.

A further object of the instant invention is to provide a magazine for convoluted motion-picture film which comprises a small number of component parts, which can be readily loaded, emptied and otherwise manipulated by persons having little skill, and which can be used in many presently known movie cameras.

Still another object of the invention is to provide a magazine which can accommodate convoluted motion-picture film in such a way that the exposed part of the film cannot be unintentionally reconvoluted onto the unexposed part.

Briefly stated, one feature of our present invention resides in the provision of a magazine for convoluted motion-picture film of the type wherein the exposed part of the film is coaxial with but axially spaced from the unexposed part. The magazine comprises a housing which defines a film-receiving chamber, and a partition which is freely rotatable in the housing and divides the chamber into a first and a second compartment respectively accommodating the exposed and unexposed parts of the film. A portion of the film is led in a helical path which extends from the second compartment, past a film platform, and into the first compartment, and the leading end of the exposed part of the film is attached to a core of the partition which extends into the first compartment and comprises a coupling portion accessible through an opening provided in one end wall of the housing so that it may serve as a means for transmitting rotary motion to the partition when connected with the film transporting mechanism of a motion-picture camera. The housing also comprises a core which extends into the second compartment and rotatably supports the unexposed part of the film. The housing is further provided with a male bearing member which supports the partition, preferably in such a way that the partition is not only rotatable but is also tiltable, within limits, with reference to the housing.

In accordance with a more specific feature of our invention, the magazine preferably comprises a blocking device which prevents rotation of the partition in one direction, namely, in a direction to unwind or to permit unwinding of the exposed film part from its core. Such blocking device may comprise a disk which is radially movably supported by the core for the exposed part of the film and is provided with at least one ratchet tooth which cooperates with at least one complementary tooth provided on the core for the exposed part of the film. When the partition is rotated in a direction to convolute the exposed part of the film onto its core, the complementary tooth or teeth simply ride over the tooth or teeth of the disk whereby the disk can yield radially. On the other hand, a complementary tooth will engage a tooth of the disk when the partition tends to rotate in a sense to unwind or to permit unwinding of the exposed film part from its core.

Figure 2:
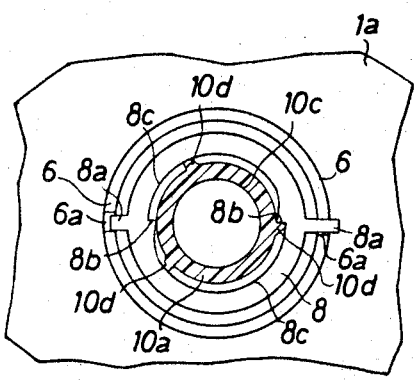

The novel features which are considered as characteristic of the invention are set forth in particular in the appended claims. The improved magazine itself, however, both as to its construction and the mode of assembling and using the same, together with additional features and advantages thereof, will be best understood upon perusal of the following detailed description of a specific embodiment with reference to the accompanying drawings, in which:

FIG. 1 is an exploded axial sectional view of a magazine for motion-picture film which embodies our invention; and FIG. 2 is a fragmentary horizontal section through the assembled magazine, substantially as seen in the direction of arrows from the line II—II of FIG. 1.

Referring now to the drawings in detail, FIG. 1 shows a magazine which comprises a two-piece housing 1 including two end walls 1a, 2 and a side wall 1b which extends between the two end walls. The end wall 2 is detachable from the remainder of the housing 1 and is provided with several snap fasteners 3 which are receivable in complementary tubular sockets 4 mounted on or integral with the end wall 1a. When the end wall 2 is attached to the remainder of the housing 1, the latter defines a film-receiving chamber 1A and this chamber accommodates a rotary disk-shaped partition 10 which divides the interior of the housing 1 into a first compartment 1B and a second compartment 1C. The compartment 1B is adjacent to the removable end wall 2 and serves to accommodate the exposed part of the motion-picture film 9. The unexposed part of the film is accommodated in the second compartment 1C which is adjacent to the end wall 1a. When a fresh supply of unexposed film is to be inserted into the housing 1, the end wall 2 and the partition 10 are removed so that the film may be placed onto an annular core 6 which is rigid or integral with the end wall 1a and extends into the compartment 1C. The leading end 9a of the unexposed film is then guided along the outer side of a platform 5 which is located behind a window 1d in the side wall 1b so that such leading end forms a helix. In the next step, the partition 10 is inserted into the chamber 1A and the leading end 9a is attached to its core 10a which extends into the compartment 1B. In the final step, the end wall 2 is reattached to the remainder of the housing 1 by snapping the fasteners 3 into the corresponding sockets 4. The end wall 2 is provided with a centrally located opening 2a which affords access to a male coupling portion 10b forming part of the core 10a so that this coupling portion may be driven by the film transporting mechanism of a motion picture camera, not shown. The core 10a is coaxial with the core 6.

The bearing for the partition 10 comprises a male bearing member which is rigid or integral with the end wall 1a and is coaxially surrounded by the annular core 6. This bearing member comprises a conical portion 7 which tapers toward the compartment 1B and a substantially hemispherical head 7a which is provided at the tip of the conical portion 7. The core 10a of the partition 10 is formed with a conical socket 10c whose innermost portion can receive the head 7a in such a way that the partition is not only rotatable on but is also tiltable, within limits, on the head 7a. This reduces friction so that the partition may be rotated by exertion of a small torque transmitted to the coupling portion 10b. In the illustrated embodiment, the entire magazine consists of a suitable synthetic thermoplastic material; however, it is equally within the purview of our invention to make the magazine of metal or to assemble the magazine of metallic and plastic parts.

The exposed end face of the annular core 6 is formed with two radial recesses 6a which are located diametrically opposite each other and receive outwardly extending projections 8a and a blocking disk 8. As shown in FIG. 2, the disk 8 is shiftable radially with reference to the core 6 and is formed with two inwardly extending ratchet teeth 8b adapted to cooperate with complementary teeth 10d provided on the periphery of the core 10a. The ratchet teeth 8b are located diametrically opposite each other and the core 10a is formed with three equidistant external teeth 10d. The disk 8 is further provided with two internal cam faces 8c which slope outwardly from the ratchet teeth 8b. It will be noted that the number of teeth 8b is different from the number of teeth 10d.

In order to withdraw unexposed film from the compartment 1C and to wind it on the core 10a, the partition 10 must be rotated in a clockwise direction as the parts appear in FIG. 2. During such winding, the unexposed part of the film travels behind the window 1d and is exposed to light rays coming from a viewed scene or subject. The teeth 10d of the core 10a travel along the cam faces 8c and ride over the ratchet teeth 8b of the disk 8 whereby the disk yields and its projections slide back and forth in the recesses 6a of the annular core 6. In other words, the disk 8 cannot prevent clockwise rotation of the partition 10. However, if the partition tends to rotate in a counterclockwise direction, one of the teeth 10d engages the radial face of the nearest ratchet tooth 8b and prevents further counterclockwise rotation of the core 10a so that the exposed part of the film cannot be unwound and its convolutions form a tight package around the core 10a. The just described blocking device prevents uncontrolled rotation of the partition 10 in response to the tendency of convoluted film in the compartment 1C to unwind itself from the core 10a.

It is clear that the improved magazine is susceptible of many modifications without departing from the spirit of our invention. For example, the annular core 6 may be replaced by a solid cylindrical core and the bearing member 7, 7a may be made integral with and may extend beyond the end face of such cylindrical core. The disk 8 is then mounted on the conical portion 7 or is radially movably coupled to the solid core. If the disk is mounted on the conical portion 7, its ratchet teeth will extend radially outwardly and the core 10a is then provided with one or more inwardly extending teeth. All such modifications will be so obvious upon perusal of the preceding disclosure that they can be readily understood by men skilled in this art without necessitating additional illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A magazine for convoluted motion-picture film of the type wherein the exposed part of the film is stored substantially coaxially with the unexposed part, comprising a housing defining a film-receiving chamber; and a partition rotatably mounted in said housing and constituting the sole means for dividing said chamber into a first and a second compartment respectively accommodating the exposed and unexposed parts of the film.

2. A magazine as set forth in claim 1, wherein said partition comprises a core extending into said first compartment for supporting the exposed part of the film.

3. A magazine as set forth in claim 1, wherein said housing comprises a core extending into said second compartment for supporting the unexposed part of the film.

4. A magazine as set forth in claim 3, wherein said core is of annular shape and further comprising a bearing for said partition, said bearing including a male bearing member rigid with said housing and surrounded by said core.

5. A magazine as set forth in claim 1, wherein said housing comprises a pair of end walls located at the opposite sides of said partition and a side wall extending between said end walls, one of said end walls being detachable from the remainder of said housing and being adjacent to said first compartment.

6. A magazine for convoluted motion-picture film of the type wherein the exposed part of the film is stored coaxially with the unexposed part, comprising a housing defining a film-receiving chamber; a partition rotatably mounted in said housing and dividing said chamber into a first and a second compartment respectively accommodating the exposed and unexposed parts of the film, said housing comprising an annular first core extending into said second compartment for supporting the unexposed part of the film and said partition comprising a second core extending into said first compartment for supporting the exposed part of the film; and a bearing for said partition including a male bearing member rigid with said housing and surrounded by said first core, said second core having a socket receiving said male bearing member so that said partition is rotatable on said bearing member.

7. A magazine as set forth in claim 6, wherein said male bearing member comprises a conical portion which tapers toward said first compartment and a substantially hemispherical head provided at the tip of said conical partion, said head being received in said socket in such a way that the partition is tiltable with reference to said conical portion.

8. A magazine for convoluted motion-picture film of the type wherein the exposed part of the film is stored coaxially with the unexposed part, comprising a housing defining a film-receiving chamber; and a partition rotatably mounted in said housing and dividing said chamber into a first and second compartment respectively accommodating the exposed and unexposed parts of the film, said housing comprising a pair of end walls located at the opposite sides of said partition and a side wall extending between said end walls, one of said end walls being detachable from the remainder of said housing and being adjacent to said first compartment and being provided with an opening, said partition comprising a core extending into said first compartment for supporting the exposed part of the film and having a coupling portion which is accessible through said opening to rotate said partition when coupled to the film transporting mechanism of a motion picture camera.

9. A magazine for convoluted motion-picture film of the type wherein the exposed part of the film is stored coaxially with the unexposed part, comprising a housing defining a film-receiving chamber; a partition rotatably mounted in said housing and dividing said chamber into a first and a second compartment respectively accommodating the exposed and unexposed parts of the film, said partition and said housing comprising first and second cores respectively extending into said first and second compartments for supporting the exposed and unexposed parts of the film, the exposed part of the film having an end attached to said first core; and blocking means for holding the partition against rotation in one direction so that the partition is rotatable only in a direction to draw the film from said second compartment into said first compartment and to convolute the thus withdrawn film onto said first core.

10. A magazine as set forth in claim 9, wherein said blocking means comprises a disk radially movably supported by said second core and having at least one ratchet tooth, and at least one complementary tooth provided on said partition and arranged to engage said ratchet tooth when the partition tends to rotate in said one direction.

11. A magazine as set forth in claim 10, wherein said disk comprises a plurality of equidistant radially inwardly extending ratchet teeth and wherein said partition comprises a plurality of complementary teeth provided on said first core, the number of said ratchet teeth being different from the number of said complementary teeth.

12. A magazine as set forth in claim 11, wherein each of said ratchet teeth comprises a radial face and said disk is provided with internal cam faces sloping outwardly from the inner ends of said radial faces.

References Cited
UNITED STATES PATENTS 3,208,685   9/1965   Edwards et al. _____ 242—71.2
3,208,686   9/1965   Edwards et al. _____ 352—78 X NORTON ANSHER, *Primary Examiner.*

M. H. HAYES, *Assistant Examiner.*

U.S. Cl. X.R.

242—71.2